(12) United States Patent
Yeom et al.

(10) Patent No.: US 10,418,055 B1
(45) Date of Patent: Sep. 17, 2019

(54) DUAL-STAGE HEAD SUSPENSION ASSEMBLY HAVING ADDITIONAL MICROACTUATOR PAIR

(71) Applicant: Seagate Technology LLC, Cupertino, CA (US)

(72) Inventors: Taiho Yeom, St. Paul, MN (US); Razman Zambri, Eden Prairie, MN (US); Ravishankar Shivarama, Eden Prairie, MN (US); Bradley Jay Ver Meer, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/963,501

(22) Filed: Apr. 26, 2018

(51) Int. Cl.
  *G11B 5/48* (2006.01)
  *G11B 5/596* (2006.01)
(52) U.S. Cl.
  CPC .......... *G11B 5/4873* (2013.01); *G11B 5/4833* (2013.01); *G11B 5/59627* (2013.01)
(58) Field of Classification Search
  CPC ............................... G11B 5/48; G11B 5/4873
  USPC ............................................ 360/294.2–294.5
  See application file for complete search history.

(56) References Cited

U.S. PATENT DOCUMENTS

| | | |
|---|---|---|
| 5,060,210 A | 10/1991 | Fennema et al. |
| 5,920,441 A | 7/1999 | Cunningham et al. |
| 5,949,617 A | 9/1999 | Zhu |
| 5,998,994 A | 12/1999 | Mori |
| 6,005,742 A | 12/1999 | Cunningham et al. |
| 6,064,550 A | 5/2000 | Koganezawa |
| 6,219,193 B1 | 4/2001 | Janz |
| 6,376,964 B1 | 4/2002 | Young et al. |
| 6,414,822 B1 | 7/2002 | Crane et al. |
| 6,504,669 B1 * | 1/2003 | Janz ...................... G11B 5/5552 360/78.05 |
| 6,510,752 B1 * | 1/2003 | Sacks ................... G11B 5/5552 324/210 |

(Continued)

FOREIGN PATENT DOCUMENTS

JP 2013157063 A 8/2013

OTHER PUBLICATIONS

"Dual-Stage Actuator," brochure, HGST—a Western Digital Company, 3 pages, Oct. 2013.

(Continued)

*Primary Examiner* — Allen T Cao
(74) *Attorney, Agent, or Firm* — Kagan Binder, PLLC (57) ABSTRACT

A head suspension assembly for supporting a read/write head of a disk drive located on a rotatable drive actuator arm is disclosed. The head suspension assembly includes a baseplate end proximate to and operatively connected to a first microactuator pair, the first microactuator pair communicatively coupled to a controller. The head suspension assembly also includes a load beam movably connecting the first microactuator pair to a second microactuator pair. The head suspension assembly also includes a head transducer end proximate to and operatively connected to the second microactuator pair, the second microactuator pair communicatively coupled to the controller. The read/write head is located proximate to the head transducer end, the read/write head being flexibly connected to the load beam, and the controller is configured to selectably transmit control signals to the first and second microactuator pairs in order to improve tracking control of the read/write head.

20 Claims, 8 Drawing Sheets

(56) References Cited

U.S. PATENT DOCUMENTS

| | | |
|---|---|---|
| 6,542,326 B1 * | 4/2003 | Ell .................... G11B 5/5552 360/78.05 |
| 6,621,653 B1 | 9/2003 | Schirle |
| 6,680,810 B2 | 1/2004 | Shiraishi et al. |
| 6,724,563 B2 | 4/2004 | Kobayashi et al. |
| 6,747,833 B2 | 6/2004 | Shimokoshi et al. |
| 7,345,851 B2 | 3/2008 | Hirano et al. |
| 7,382,583 B2 | 6/2008 | Hirano et al. |
| 7,466,520 B2 | 12/2008 | White et al. |
| 7,502,192 B1 | 3/2009 | Wang et al. |
| 7,612,967 B2 | 11/2009 | Kwon et al. |
| 8,125,741 B2 | 2/2012 | Shelor |
| 8,264,797 B2 | 9/2012 | Emley |
| 8,339,748 B2 | 12/2012 | Shum et al. |
| 8,345,851 B2 | 1/2013 | Vadlakonda et al. |
| 8,873,189 B2 | 10/2014 | Hideki |
| 8,953,276 B1 | 2/2015 | Pokharel et al. |
| 9,053,729 B1 | 6/2015 | Kumar et al. |
| 2007/0178746 A1 * | 8/2007 | Guo .................... G11B 5/4813 439/406 |
| 2013/0152695 A1 * | 6/2013 | Ramakrishnan ..... G11B 5/5552 73/774 |
| 2018/0040343 A1 | 2/2018 | Ee et al. |

OTHER PUBLICATIONS

Kobayashi et al., "Adaptive Control of Dual-Stage Actuator for Hard Disk Drives," Proceeding of the 2004 American Control Conference, Boston, Massachusetts Jun. 30-Jul. 2, 2004, pp. 523-528.

* cited by examiner

DUAL-STAGE HEAD SUSPENSION ASSEMBLY HAVING ADDITIONAL MICROACTUATOR PAIR

BACKGROUND

The present disclosure relates to aspects of head suspension assemblies as are utilized for movably supporting a head within a disk drive, and in particular to head suspension assemblies that include piezoelectric microactuators for fine head movement and control.

Hard-disk drives (HDDs) are examples of data storage devices that include one or more rotatable disks to which data is written and read by way of magnetic read/write transducer heads that are movably supported with respect to surfaces of the disks by a corresponding number of head gimbal assemblies (HGAs) that can together form a head stack assembly of HGAs. One HGA is typically movably supported relative to a respective disk surface so that a magnetic read/write head can be selectively positioned relative to a data track of the disk surface. Such magnetic head is typically provided on an aerodynamically-designed slider so as to fly closely to the disk surface, at a so-called "fly height," of several nanometers above the disk surface while the disk is spinning. Each HGA is typically connected to a rotatable drive actuator arm for moving a read/write head and slider including a flexure or gimbal over the disk surface for data writing and reading. Each actuator arm is connected to be driven by a voice coil drive actuator servomechanism device. Such an assembly allows each magnetic read/write head to be independently controlled for positioning relative to specific data tracks of a disk surface.

As HDD data storage needs have increased, typical data track density on disk surfaces has also steadily increased in order to obtain greater data storage within a given disk surface area. This disk surface density is commonly referred to as areal density. Specifically, the data tracks themselves have become narrower and the radial spacing between tracks has decreased in order to increase disk areal density.

In order to improve fine movements of a magnetic read/write head as provided to a slider of a HGA, and to obtain greater data resolution, various servo actuators have been developed and employed in HDD applications. In general, a voice coil drive actuator provides a coarse movement for positioning of the magnetic read/write head to the data tracks. If a finer movement is also desired, a microactuator can then provide a second, finer movement for resolution of data tracks within high density HDDs. Such systems are referred to as dual-stage servo-actuated suspension systems.

Presently, drives that use a dual-stage actuation may utilize head-level microactuation during conditions like servo-fault, "buzz" conditions, factory bode sweeps, etc. Head-level microactuation may also be referred to as co-located microactuation. The placement of a microactuator within the HGA often leads to challenges in terms of design, performance and manufacturability. Head-level co-located microactuation may also include independent actuation of a slider and/or surrounding structures, which may be flexibly connected to an articulated microactuator arm through a rigid load beam.

A microactuator typically includes and makes use of one or more elements composed of piezoelectric crystal material, such as lead zirconate titanate (PZT). Other such elements can be strategically provided at one or more locations along an HGA, and may be provided in symmetric pairs for use in deflecting and deforming the HGA or parts thereof. An HGA typically includes a baseplate for connection with an actuator arm, a load beam including a baseplate portion, a spring portion and a rigid region, and a flexure (or alternatively, a gimbal) that supports a slider with a magnetic read/write head and that allows the head to pitch and roll about a dimple on the load beam. The interconnection of the flexure and load beam allow for pitch and roll movement of the aerodynamically-designed slider relative to a spinning disk surface as the slider flies on an air bearing created by the spinning disk.

Microactuators have been developed to work in conjunction with and be structurally connected to various HGA components, such as baseplates, load beams, and flexures. Microactuators are generally configured to cause a distortion of material, typically stainless steel, by providing an electric field across one or more fixed elements of piezoelectric material. A controlled application of a voltage difference across a piezoelectric microactuator, such as PZT, causes the piezoelectric microactuator to expand or contract, in order to distort the baseplate, load beam, or flexure, and thus controllably provide a fine movement of the slider and head with respect to a specific data track on the disk. An application of electric signals to PZT produces a deformation, and conversely, a deformation in the PZT produces an electric signal.

Microactuators can be structurally provided in symmetric, lateral pairs for controlled deflections. A microactuator pair can act together by applying similar magnitude but opposite polarity electric fields to the associated piezoelectric element pair depending upon the location and arrangement of the piezoelectric element pair. Typically, a microactuator pair includes a pair of PZT elements. The two paired PZT elements are identical to each other, with the exception of poling direction. So, when a positive voltage is applied to both the PZTs, one element expands or lengthens, while the other element contracts or shortens, transmitting a lateral motion to the head.

In order to controllably actuate such piezoelectric microactuators, positive and negative electrical connections are generally provided to each of the pair of piezoelectric microactuators. Conductors are typically provided along HGAs, extending to the head for read/write functionality, and for providing voltage across the piezoelectric microactuators of a dual-stage actuated head suspension.

Depending on the location and positioning of the microactuators, the suspensions (e.g., HGAs) are generally classified as "load beam bias" microactuator-based suspensions or "co-located" microactuator suspensions. In a load beam bias type microactuator HGA, the microactuators are located on the load beam, near the baseplate. In a co-located type microactuator HGA, the microactuators are located in an area at slider end of the HGA. The moment caused by forces from the microactuators are transmitted to the slider through the load beam.

In a co-located microactuator-based HGA layout, a pair of microactuators are typically located near the slider and are connected to the flexure (e.g., a gimbal). The moment forces from microactuation are transmitted to the slider through the flexure. An electrical input to each of the microactuators of the pair may create an equal and opposite movement between them, leading to a lateral movement at the slider, transmitting through the flexure.

Each of the discussed mentioned microactuation configurations has respective advantages and challenges, and the choice of microactuation configuration may significantly influence the driving and control schemes used by a servo actuation system. The load beam bias microactuator-based suspension generally provides the advantage of larger displacement per unit input. However, greater reaction forces transmitted back to the actuator arm may excite or cause undesirable resonances and a degradation of tracking performance. The co-located microactuator-based suspension generally provides the advantage of minimizing the reaction forces on the actuator arm (at typical tracking frequencies) by providing a pivot about the dimple on the load beam, however, has the challenge of lower displacement per unit input voltage. As a result, it is challenging to implement in a design that requires a relatively large range of head motion while maintaining a desirable degree of reaction force feedback through the actuator arm.

Resonance can include a vibration of large amplitude in a mechanical or electrical system caused or contributed to by a relatively small periodic stimulus of the same or nearly the same period as the natural vibration period of the system, and the adjustment thereof. Vibration and resonance at various frequencies can be measured in displacement, which can produce a corresponding and resultant voltage. As a shortcoming of existing configurations, undesirable resonance or other vibration at a head may cause various inefficiencies related to writing or reading magnetic media. For example, undesirable resonance may cause offtrack errors or interfere with servo performance. In some cases, undesirable resonance can cause slider-disk contact which may lead to catastrophic failure of the disk and/or drive. Existing microactuation structures choose between sensing and actuation using the microactuator set associated with an HGA. Therefore, there is a desire to control for undesirable resonance within HGAs of HDDs.

SUMMARY

The present disclosure overcomes various disadvantages and shortcomings of the prior art disk drive technology by improving the servo tracking performance of heads in hard disk drives (HDDs) through the use of multiple sets of microactuators in dual-stage head gimbal assemblies (HGAs).

Traditionally, in HDD head suspension assemblies, a single paired set of microactuators, either of a load beam bias type or a co-located type, are employed to control head movement. An additional, second set of microactuators in a dual-stage suspension can provide the respective advantages found previously in both load beam bias-based and co-located head suspension assemblies.

By employing both load beam bias-based and co-located head suspension assemblies, the assemblies together have many benefits, including a higher actuation range, greater tracking precision and control, and an ability to reduce reaction forces and undesirable resonance and/or vibration using both types of microactuators on a single load beam. One benefit of the described dual-stage and reversible HGA configurations is the ability to have both an increased rotational range of a head position, controllability, and the ability to have precision and resonance-based improvements when compared to existing configurations. In particular, using load beam and co-located microactuators on the same load beam of an HGA can allow a larger stroke (i.e., rotational range of movement of a load beam) and higher resonance frequencies in a single assembly. The major drawback of the load beam based microactuators and co-located microactuators are lower resonance modes and lower stroke, respectively. Having both on the same suspension enables servo control schemes that combines the best features of each set of actuators.

Another benefit of described dual-stage and reversible HGA configurations with both load beam bias and co-located microactuators includes both sensing and actuation function simultaneously, which can be used to implement control to compensate for undesirable resonance during reading and/or writing to HDD media. By using two sets of microactuators, a first set can be employed for actuation of a slider while a second set simultaneously picks up offtrack response based on the actuation at the first set and during use of the HGA. Furthermore, deflection in the form of displacement of head within the HGA can be analyzed and used in conjunction with the offtrack gain sensed in order to control for undesirable resonance at the head.

Described methods and structures provide for improved controllability and/or resonance mitigation of servo microactuator actuation for fine movements and positioning of magnetic read/write heads relative to disk data tracks as part of dual-stage actuated HGA systems.

According to a first aspect of the present disclosure a head suspension assembly for supporting a read/write head of a disk drive located on a rotatable drive actuator arm is disclosed. The head suspension assembly includes a baseplate end proximate to and operatively connected to a first microactuator pair, the first microactuator pair communicatively coupled to a controller. The head suspension assembly also includes a load beam movably connecting the first microactuator pair to a second microactuator pair. The head suspension assembly also includes a head transducer end proximate to and operatively connected to the second microactuator pair, the second microactuator pair communicatively coupled to the controller. According to the first aspect, the read/write head is located proximate to the head transducer end, the read/write head being flexibly connected to the load beam, and the controller is configured to selectably transmit control signals to the first and second microactuator pairs in order to improve tracking control of the read/write head.

According to a second aspect of the present disclosure, another head suspension assembly for supporting a read/write head of a disk drive located on a rotatable drive actuator arm is disclosed. The head suspension assembly includes a baseplate end proximate to and operatively connected to a first microactuator pair, the first microactuator pair communicatively coupled to a controller. The head suspension assembly also includes a load beam movably connecting the first microactuator pair to a second microactuator pair. The head suspension assembly also includes a head transducer end proximate to and operatively connected to the second microactuator pair, the second microactuator pair communicatively coupled to the controller. According to the second aspect, the read/write head is located proximate to the head transducer end, the read/write head being flexibly connected to the load beam, and the controller is configured to selectably transmit and receive head resonance signals to and from the first and second microactuator pairs in order to reduce an undesired resonance.

According to a third aspect of the present disclosure, a storage device is disclosed. The storage device includes a rotatable storage disk, a rotatable drive actuator arm, a read/write head located on the rotatable drive actuator arm, a controller, and a head suspension assembly. According to the third aspect, the head suspension assembly includes a baseplate end proximate to and operatively connected to a first microactuator pair, the first microactuator pair communicatively coupled to the controller. The head suspension assembly also includes a load beam movably connecting the first microactuator pair to a second microactuator pair. The head suspension assembly also includes a head transducer end proximate to and operatively connected to the second microactuator pair, the second microactuator pair communicatively coupled to the controller. According to the third aspect, the read/write head is located proximate to the head transducer end, the read/write head being flexibly connected to the load beam, and the controller is configured to selectably transmit control signals to the first and second microactuator pairs in order to improve tracking control of the read/write head.

BRIEF DESCRIPTION OF THE DRAWINGS

Other important objects and advantages of the present disclosure will be apparent from the following detailed description of the disclosure taken in connection with the accompanying drawings.

DETAILED DESCRIPTION

The foregoing specific embodiments of the present disclosure as set forth in the specification herein are for illustrative purposes only. Various deviations and modifications may be made within the spirit and scope of the disclosure without departing from the main theme thereof.

Figure 1:
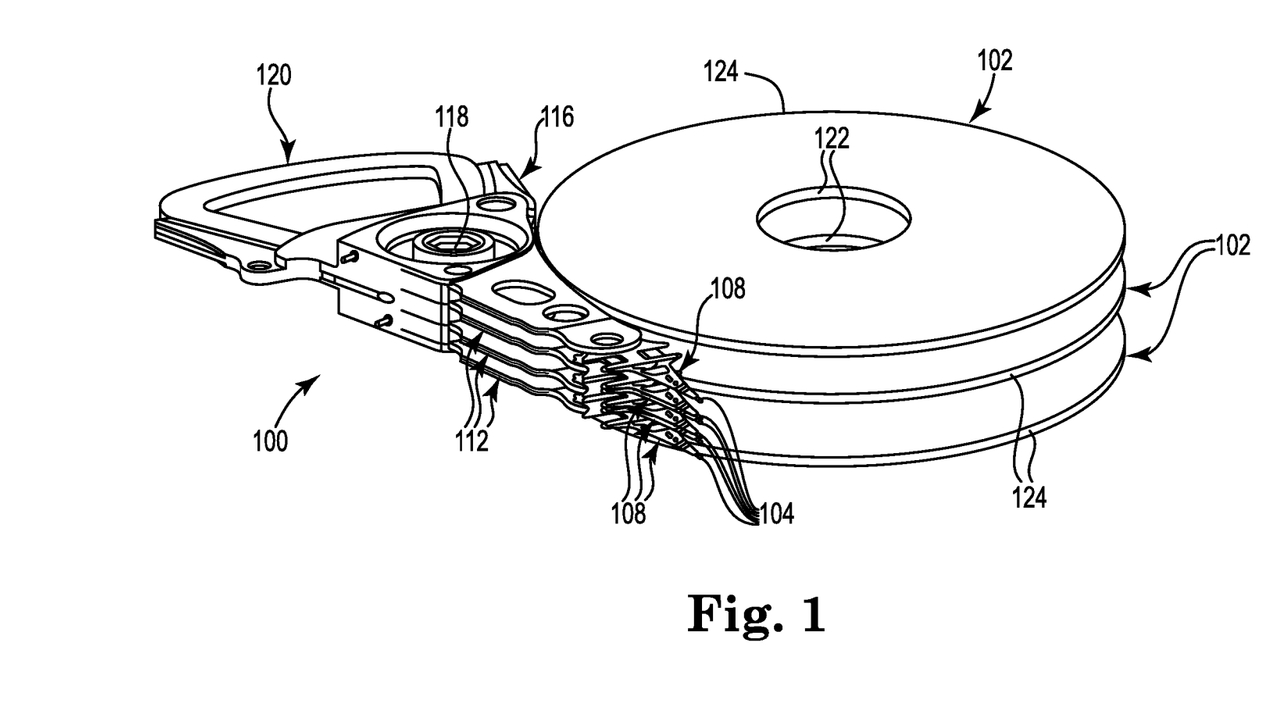
FIG. 1 is a perspective view of a head stack assembly including plural stacked actuator arms with each arm having a head suspension assembly, according to various embodiments.

FIG. 1 is a perspective view of exemplary components of a data storage device (e.g., a hard disk drive [HDD]) including a head stack assembly 100 and media 102. In one embodiment, magnetic media 102 stores information as domains in a plurality of circular, concentric data tracks on data disks as such disks are conventionally mountable to a spindle motor assembly (not shown) that can rotate media 102 and cause its data surfaces to pass under respective bearing slider surfaces. As illustrated, each surface of media 102 has an associated slider 104, each of which slider 104 carries a magnetic read/write head including read and write transducers that communicate with the data tracks of the surfaces of media 102.

Each slider 104 is supported by a head gimbal assembly (HGA) 108 of a head suspension assembly, which are in turn attached to rotatable drive actuator arms 112 of an actuator mechanism 116 to form the head stack assembly 100. Actuator mechanism 116 can be rotated about a shaft 118 by a voice coil drive actuator 120, which can be conventionally controlled by servo control circuitry (or "controller," as used herein). Voice coil drive actuator 120 can rotate actuator mechanism 116 in either rotational direction for controllably positioning the HGAs 108 over the surfaces of the spinning disks and thus the heads of the sliders 104 relative to desired data tracks between inner diameters 122 and outer diameters 124 of media 102. As also well known, the sliders 104 are themselves aerodynamically designed to fly on an air bearing that is created adjacent to each disk surface during disk rotation.

Figure 2:
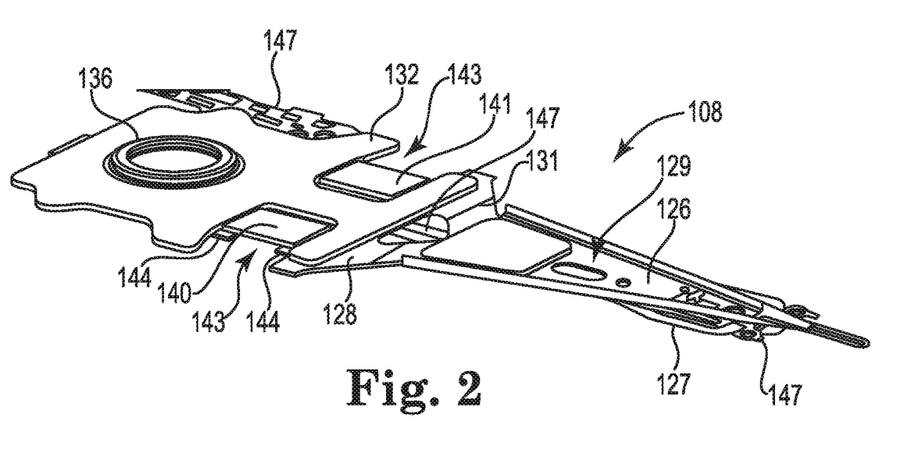
FIG. 2 is a perspective view of a head suspension assembly including a pair of microactuators arranged in the baseplate region of the head suspension assembly and including electrical connection components, according to various embodiments.
Figure 3:
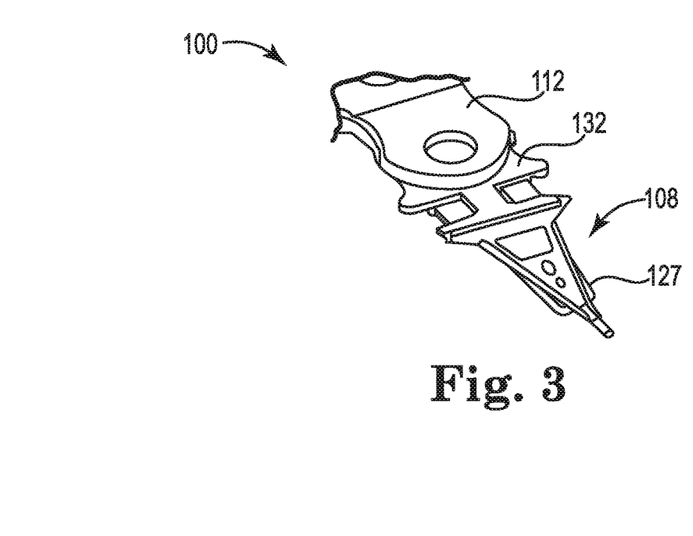
FIG. 3 is a perspective view of a head suspension assembly as attached to an actuator arm at the baseplate, according to various embodiments.

FIG. 2 is an enlarged perspective view of exemplary HGA 108 in accordance with aspects of the present disclosure. FIG. 3 is a partial perspective view of the head stack assembly 100 illustrated in FIG. 1 including HGA 108 as illustrated in FIG. 2 and as connected with an actuator arm 112 (shown in FIG. 1) for movement relative to a disk surface. HGA 108 includes a load beam 126, a flexure 127, a mount or baseplate 132, and a slider 104. The load beam itself includes a base portion that is connected with the baseplate 132, such as by laser welding, a spring or hinge region 131, and a rigid region 129 leading from the spring region to the tip of the HGA 108. Load beam 126 supports the slider 104 (shown in FIG. 1) carrying transducers via the separately formed and attached flexure 127. Alternatively, an integrated gimbal can be utilized instead of the flexure 127, as well known. For example, a gimbal is typically integrated into load beam 126, while a flexure is a separate component that can be laser welded to load beam 126 and provides a slider mounting portion that is pivotable about a dimple on the load beam 126, as provided from an end portion of the rigid region 129 of the load beam 126, such as illustrated. Regardless of type, a gimbal or a flexure 127 provides a movable slider mounting pad to which slider 104 is attached so that the slider can move at least in pitch and roll directions in response to variations while flying relative to a disk surface.

The spring or hinge region 131 provides load beam 126 with a preload force that acts against the lift force action of the aerodynamic slider as it flies relative to a disk surface. The preload force urges the slider 104 towards the surface of a medium during flight to maintain a desired fly height. In some embodiments, hinge 131 is a separate component from load beam 126 and can be connected to load beam 126 by laser welding. In other embodiments, hinge 131 is integrated with and contiguous with load beam 126 as a single part. Mount plate or baseplate 132 provides an attachment structure for coupling actuator arm 112 to a HGA 108. In one embodiment, baseplate 132 is laser welded to a baseplate portion 128 of the load beam 126. As illustrated in FIG. 2, the attachment structure can be a boss tower 136 of the baseplate 132 that is configured to insert into an aperture (not shown) of an actuator arm 112 and undergo a swaging process, such as ball swaging, to couple actuator arm 112 to a HGA 108. Boss tower 136 is preferably integrally formed with baseplate 132 and may be made of the same material. For example, baseplate 132 can be made of a ferrite, such as stainless steel, or other suitable materials such as aluminum, engineered plastic, and the like.

As shown, HGA 108 also includes a pair of microactuators 140 and 141. While voice coil drive actuator 120 (see FIG. 1) rotates actuator mechanism 116 to position sliders 104 relative to desired data tracks between inner diameters 122 and outer diameters 124 of media 102 (see FIG. 1), microactuators 140 and 141 provide HGA 108 with fine or precision-type positioning of sliders 104 relative to desired data tracks between inner diameters 122 and outer diameters 124.

In one preferable embodiment, microactuators 140 and 141 are piezoelectric microactuators. Piezoelectric microactuators convert an electric signal into controlled physical displacements and, as such, piezoelectric microactuators are made of fragile materials. Exemplary materials include ceramics and metal electrode foils. A common microactuator material and design includes one or more elements of piezoelectric crystal material such as lead zirconate titanate (PZT) as such elements are strategically provided at one or more locations along HGA 108. Microactuators may also employ thermal actuators, shape memory alloys, among other methods of actuation. Microactuators have been developed to work on baseplates, load beams and flexures by causing a distortion of material, typically stainless steel of the load beam or a flexure, by providing an electric field across fixed elements of piezoelectric material.

The controlled application of a voltage difference across a piezoelectric microactuator, such as PZT, causes the piezoelectric microactuator to expand or contract, in order to distort the baseplate, load beam or flexure and thus controllably provide a fine movement of the slider and head with respect to a specific data track. In accordance with the HGA 108 of FIGS. 1-3, microactuators 140 and 141 are provided as a pair in order to controllably distort the HGA 108 within its baseplate region. In this case, the microactuators 140 and 141 are provided as a pair for controlled deflections acting together by applying similar or opposite polarity electric fields to the piezoelectric element pairs depending upon the location and arrangement of the piezoelectric element pairs.

As illustrated in FIG. 2, the pair of microactuators 140 and 141 are located within inlets 143 that are provided within the profile of the baseplate 132 and have heights that are substantially the same or less than the height of baseplate 132. In this way, a rigid material of baseplate 132 provides protection to the fragile material of microactuators 140 and 141. The microactuators 140 and 141 are each preferably supported in position by edge portions 144 of the baseplate portion 128 of the load beam 126 adjacent to the inlets 143 of the baseplate 132. Specifically, edge portions 144 preferably extend within the inlets 143 along at least two sides so as to provide a supporting ledge structure for the microactuators 140 and 141. More preferably, the edges 144 provide a surface to bond or adhere edges of the microactuators 140 and 141 so that as they are extended or retracted, they provide a predictable and controllable movement to the HGA 108. In the illustrated embodiment, extension of one of the microactuators 140 and 141 and contraction of the other of the microactuators 140 and 141 by application of opposite electric fields to each of the microactuators 140 and 141 causes a deflection or twisting of the baseplate portion 128 of the load beam 126, thus controllably moving the rigid region 129 of the load beam 126 and thus the flexure 127 and slider 104. A reverse application of electric field to each of the microactuators 140 and 141 will cause an opposite but similar deflection or twisting of the HGA 108.

Electrical conductors are provided along the HGA 108 by way of one or more flexible circuits 147 that may include any number of conductors as are needed for electrical connection with the read and write heads of the slider 104 as well as for microactuator control as discussed below. Flexible circuits 147 are well-known, per se, and as provided are bonded along HGAs, such as HGA 108, for electrical connection purposes. As shown in FIG. 2, a flexible circuit 147 runs along the load beam 126 from the baseplate region 128 all the way to near the end of the rigid region 129 to electrically connect with the read/write head of the slider 104. Typically, certain leads or traces of the flexible circuit 147 also run alongside each side of the flexure to extend to the slider 104 for balance.

A flexible circuit 147 can include any number of leads or traces that are usually composed of conductive metal, such as copper, and are commonly supported together on a substrate of semi-rigid material such a stainless steel with a layer of insulating material in between, such as comprising polyimide. Electrical connections with the slider 104 can be conventionally done with wires or direct connections as known.

To controllably provide such expansion and contraction of the piezoelectric material of the microactuators 140 and 141, an electric field can be applied across the thickness of each of the microactuators 140 and 141. To do this, a first electrical connection is preferably provided to one surface of each microactuator 140 and 141 and a second electrical connection is preferably provided to a second surface of each microactuator 140 and 141. Specifically, a positive electrical connection should be provided to one surface and a negative electrical connection provided to the other surface.

Figure 4:
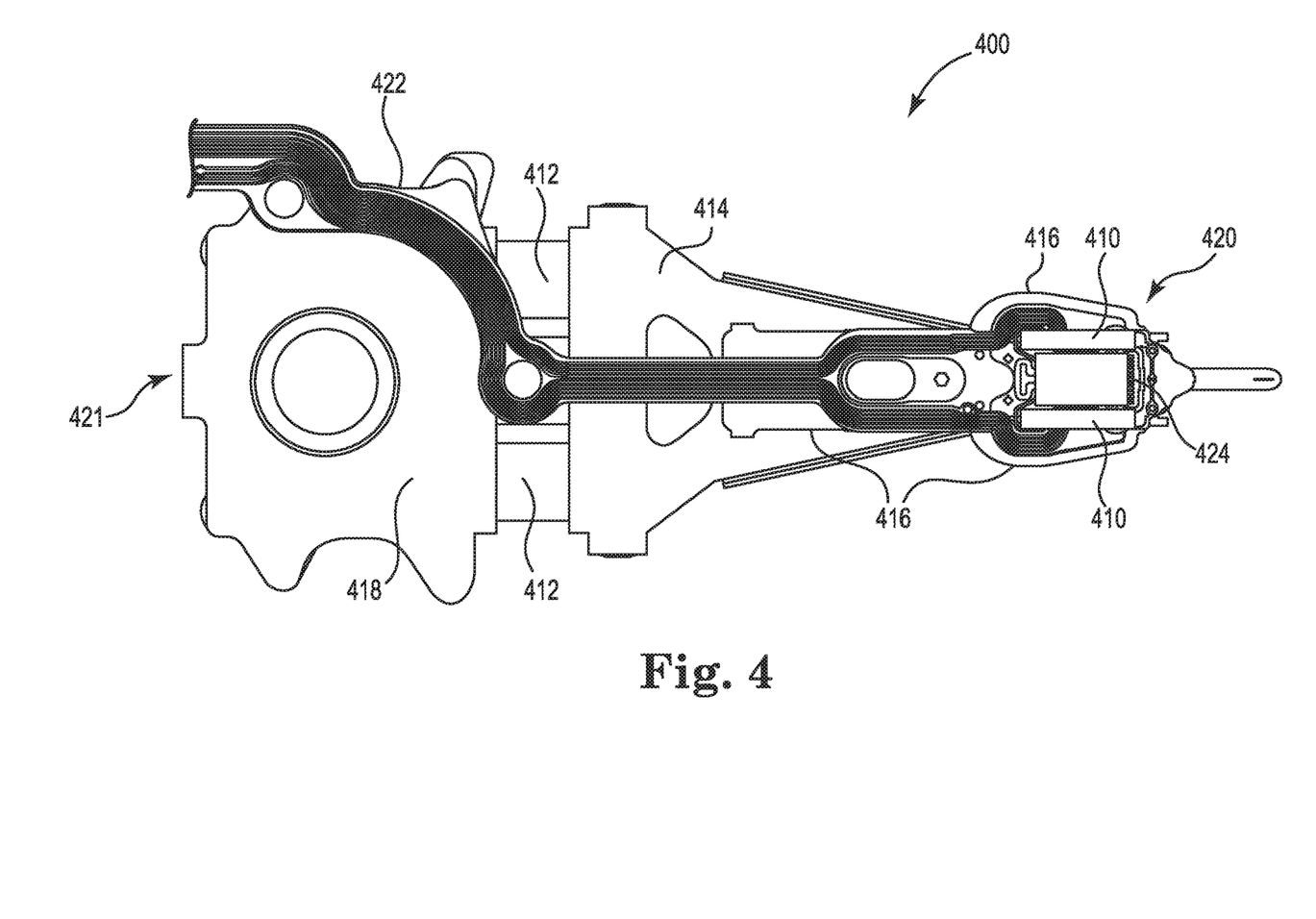
FIG. 4 shows a dual-stage HGA configuration according to various embodiments of the present disclosure.

Another embodiment of a dual-stage HGA 400 configuration according to the present disclosure is shown and described with respect to FIG. 4. As shown, the HGA 400 has a head transducer end 420 (and slider) located proximate to a head 424 and a baseplate end 421 located proximate rotatable drive actuator arm(s) 112 (see FIG. 1). As shown, HGA 400 contains a first pair of load beam bias microactuators 412. As shown, HGA 400 preferably also contains a co-located pair of microactuators 410 that are located proximate head 424 and slider (not visible in this view) located within the head transducer end 420 of the HGA 400. According to one embodiment, the load beam bias microactuator pair 412 can be primary, and the co-located microactuator pair 410 can be secondary.

Primary, as it refers to microactuator pairs herein, refers to microactuators that primarily produce a movement of a slider at the head transducer end 420. Likewise, a secondary pair of microactuators refer herein to a pair of microactuators that are principally used in a first embodiment to serve as microactuators of a higher resonant and/or more precise structure. In a second embodiment, the secondary pair of microactuators can be a pair of microactuators that are used to sense and detect feedback resulting from and corresponding to movement caused by the primary pair. Feedback at the various microactuators (e.g., the secondary pair) can take the form of offtrack gain. As used herein, offtrack gain can be measured in logarithmic decibels (dB) or units of voltage difference. It is contemplated in embodiments, that a primary pair and a secondary pair of microactuators can have their relative functions and roles reversed, depending on an embodiment. The primary and secondary pairs of microactuators can have their functions reversed without structurally changing HGA 400, as piezoelectric microactuator pairs are generally reversible, and can function to produce or to sense feedback inputs such as gain (e.g., units of voltage, dB, etc.). The gain at the HGA 400 can be expressed in units of dB as a function of vibration frequency (Hz), and can represent one of one or more dynamic performance characteristics that can be include a ratio of displacement or voltage feedback per input signal. The primary and secondary pairs of microactuators can collectively also be referred to as primary and secondary microactuators, herein.

Microactuator pair 412, as shown, are load beam bias microactuators 412, which may be microactuators, miniactuators, or other actuators, and may be operatively connected to a load beam 414 and located near and/or attached to baseplate connection portion 418 at the baseplate end 421, e.g., as shown and described with respect to FIGS. 1-3. Microactuator pair 412 can be collectively analogous to the pair of microactuators 140 and 141 of FIG. 2. The primary pair of actuators, as described above, can be either the load beam bias microactuators 412 or the co-located microactuators 410. The terms microactuator, miniactuator, and actuator may be used interchangeably herein, or may denote relative scale of various actuators.

In one preferable embodiment, the dual-stage HGA 400 includes a first pair of load beam bias microactuators 412 proximate to and operatively connected to a baseplate connection portion 418. Baseplate connection portion 418 can be configured to be connected to a baseplate, such as 132 in FIG. 2, such as discussed in greater detail with respect to FIGS. 1-3. The load beam 414 may movably connect the first pair of microactuators 412 (load beam bias microactuators 412) to a second pair of microactuators 410 (co-located microactuators 410) proximate to and connected to a head transducer end 420 located opposite the baseplate connection portion 418 and baseplate end 421. As described herein, the load beam bias microactuators 412 can be configured for coarser movement of the load beam 414 and head 424, as compared to the co-located actuators 410, which can be smaller in size and are located closer to the head 424.

The co-located pair of microactuators 410 can be positioned and operatively connected between a gimbal stainless steel flexure 416. In various embodiments, the co-located pair of microactuators 410 can be located either between two points of a flexure 416 or at the tip of the load beam 414 and the flexure 416. Various other embodiments are also contemplated, including an embodiment when the co-located pair of actuators 410 are attached to the flexure 416 and include a separate interposer piece to which a slider is attached (not shown). In various embodiments, and as shown, the flexure 416 can include two separate flexible, spring-like flexure beams located laterally to the co-located pair of microactuators, the flexure beams individually connecting the load beam 414 to the head 424 to flexibly supplement a connection of the load beam 414 to the head 424 via the co-located pair of microactuators 410. The flexure 416 can also function to create a vertical (e.g., z-axis), spring-like biased resistance during HDD use with respect to an air bearing caused by a spinning disk with respect to a slider. In preferable embodiments, the flexure 416 can provide stability to the head 424, including during actuation, and can also provide a default or resting location to the head 424 and slider during times of no actuation. The flexure 416 can flexibly connect head transducer end 420 and read/write head 424 to load beam 414. Various examples of gimbals may be used in place of flexure 416.

Electrical connections 422 (e.g., traces) for use with the read/write head 424 are depicted as following baseplate connection portion 418 and load beam 414, and operatively connecting to load beam bias microactuators 412, co-located microactuators 410, and read/write head 424.

Each microactuator of the load beam bias pair of microactuators 412 can individually connect the baseplate connection portion 418 to the load beam 414, and preferably with each of the microactuators located at a distance from the other, and the co-located pair of microactuators 410 may also have a smaller microactuator-to-microactuator spacing and separation compared to the equivalent (vertical, as shown) larger spacing of the pair of load beam bias microactuators 412. The relative spacing of individual microactuators of the microactuator pairs can dictate how much rotational movement and/or torque result from applying a certain voltage to the microactuator pair. Likewise, if a movement caused by other system forces occurs at the microactuator pair, a voltage can be produced as a response, piezoelectrically.

For example, the co-located pair of microactuators 410 can include of a pair of individual PZT elements. In an embodiment where the co-located microactuators 410 become excited, either during actuation or sensing, one element expands and the other one contracts due to an electrical input of the individual co-located microactuators 410 have an opposite polarity (or likewise, as a result of a movement to the microactuators, causing an electrical output instead). Such an application of opposite polarity to the individual microactuators can provide a lateral motion or moment to the head and slider, according to various embodiments. In an example of HGA 400, the load beam bias microactuators 412 are also composed of a pair of PZT elements such that during piezoelectric excitation, one element expands and the other element contracts, providing or correlating to a lateral movement to the head transducer end 420 (and therefore the slider).

In preferable embodiments, the load beam bias pair of microactuators 412 can be made of PZT, as described above. In other contemplated embodiments, the load beam bias pair of microactuators 412 could alternatively be made of other, non-piezoelectric actuation schemes, such as thermal actuators, shape memory alloys, etc. Any other type of actuation that could provide various ranges of motion of the head transducer end 420 with suitable low response times could be utilized, according to various embodiments.

The co-located pair of microactuators 410 may preferably be utilized for (e.g., finer) tracking control and head 424 movement, while the load beam bias pair of microactuators 412 may preferably be utilized to improve or adjust the range (e.g., coarser) of motion for the head 424 during reading and/or writing. It is noted with reference to FIG. 1, that voice coil drive actuator 120 can produce yet a coarser movement or adjustment than the load beam bias pair of microactuators. This relative coarseness of movement or adjustability of the various components can be due at least in part to the physical size, location, and configuration of each of the microactuator pairs and the voice coil drive actuator 120. Although it is noted that in embodiments of the present disclosure, the two pairs of microactuators can preferably represent primary and secondary microactuators in order of coarseness of movement and various resonance properties, the roles can be reversed and apportioned in various other ways, including utilizing the co-located microactuator pair 410 as primary, and the load beam bias microactuator pair 412 as secondary.

In particular, the two pairs of microactuators could both be utilized for actuation in tandem, with the same bias effect or opposite bias effect giving, e.g., finer head 424 movement, plus a second pair can be actuated opposite or same to improve resonance performance, or to, give, e.g., coarser head 424 movement, as described herein. Alternatively, one of the possible advantages of an HGA 400 with multiple independent pairs of microactuators (such as microactuator pairs 410 and 412) is that, given various conditions, such microactuator pairs could together be utilized as a servo sensor-actuator pair combination unit, where one pair of microactuators serve to sense, and the other serves to actuate (e.g., one is secondary, and the other primary, respectively).

As discussed above, contemplated advantageous features of the dual-stage HGA 400 having both a pair of load beam bias microactuators 412 and a pair of co-located microactuators 410, is increased controllability and resonance features. Alternatively, embodiments allow for concurrent sensing/actuation, and therefore a different form of fine control functionality for this reason. For example, when one of the microactuator pairs is being used for servo actuation, where current is controllably provided to one or both of one microactuator pair, the other pair can be concurrently and advantageously utilized for servo sensing where the microactuator pair senses deformation or other irregularities, etc., caused by other forces on the HGA 400 system. Knowing and analyzing the concurrent microactuator pair readings and settings can be utilized to substantially benefit head read/write performance in an HDD.

In one embodiment of concurrent sensing/actuation for improved servo control, a primary pair of microactuators can be preferably employed to actuate a head 424, whereby a secondary pair of microactuators can simultaneously be employed to sense feedback at the head 424, whereby a control scheme can be employed to fine tune head movement in light of the detected resonance gain. The control scheme can be a closed-loop control scheme and can be used to adjust inputs at the primary and/or secondary microactuators to improve performance. For example, the control scheme can be used to compensate for various resonance and/or feedback issues present during actuation, including resonance that may be challenging to reduce using other structures. See controller 816 of FIG. 8 for greater detail.

Many other variations in actuations using the independent pairs of microactuators are also contemplated.

Since both microactuator pairs are preferably made of PZT, each pair can be inherently fully reversible, and can be utilized either for servo sensing or actuation, as desired. In some cases, a microactuator pair can be used for both sensing and actuation, but there are benefits to dividing sensing and actuation to separate microactuator pairs, as described herein. In some cases the microactuator pairs are dynamically reversible on-the-fly, and in other cases the microactuator pairs are manufactured to a specification, PZT composition, and shape based on each microactuator pair's desired function. According to one embodiment, a secondary microactuator pair is configured for sensing and a primary microactuator pair is configured for actuation based on the sensing at the secondary microactuator pair.

Therefore, a benefit of a dual-stage HGA with both load beam bias microactuators 412 and co-located microactuators 410, can be greater precision and control due to the pairs of microactuators 412 and 410. Another benefit can be a reversible HGA having flexibility and configurability, in that the improved HGA can efficiently perform both sensing and actuation function simultaneously, as opposed to existing structures that have required an exclusive choice between sensing and actuation for an HGA.

Figure 5:
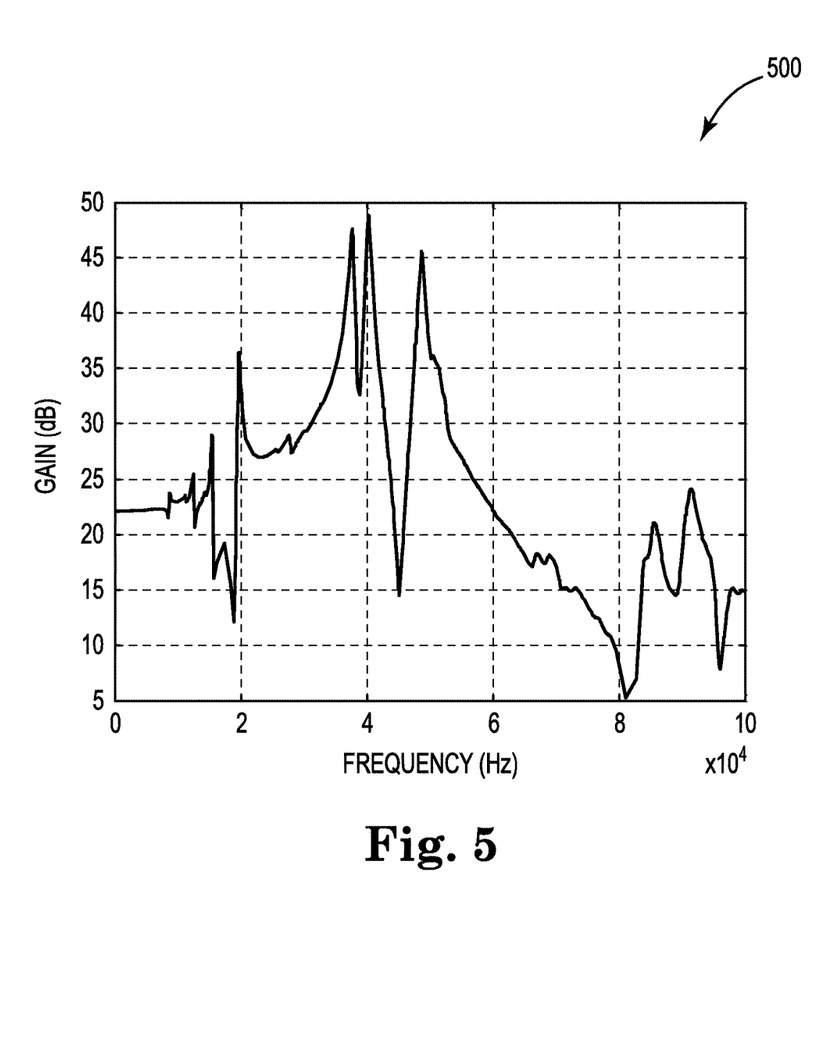
FIG. 5 is a graph showing gain graphed over a frequency spectrum of an example range for a single microactuator pair, according to various embodiments.
Figure 8:
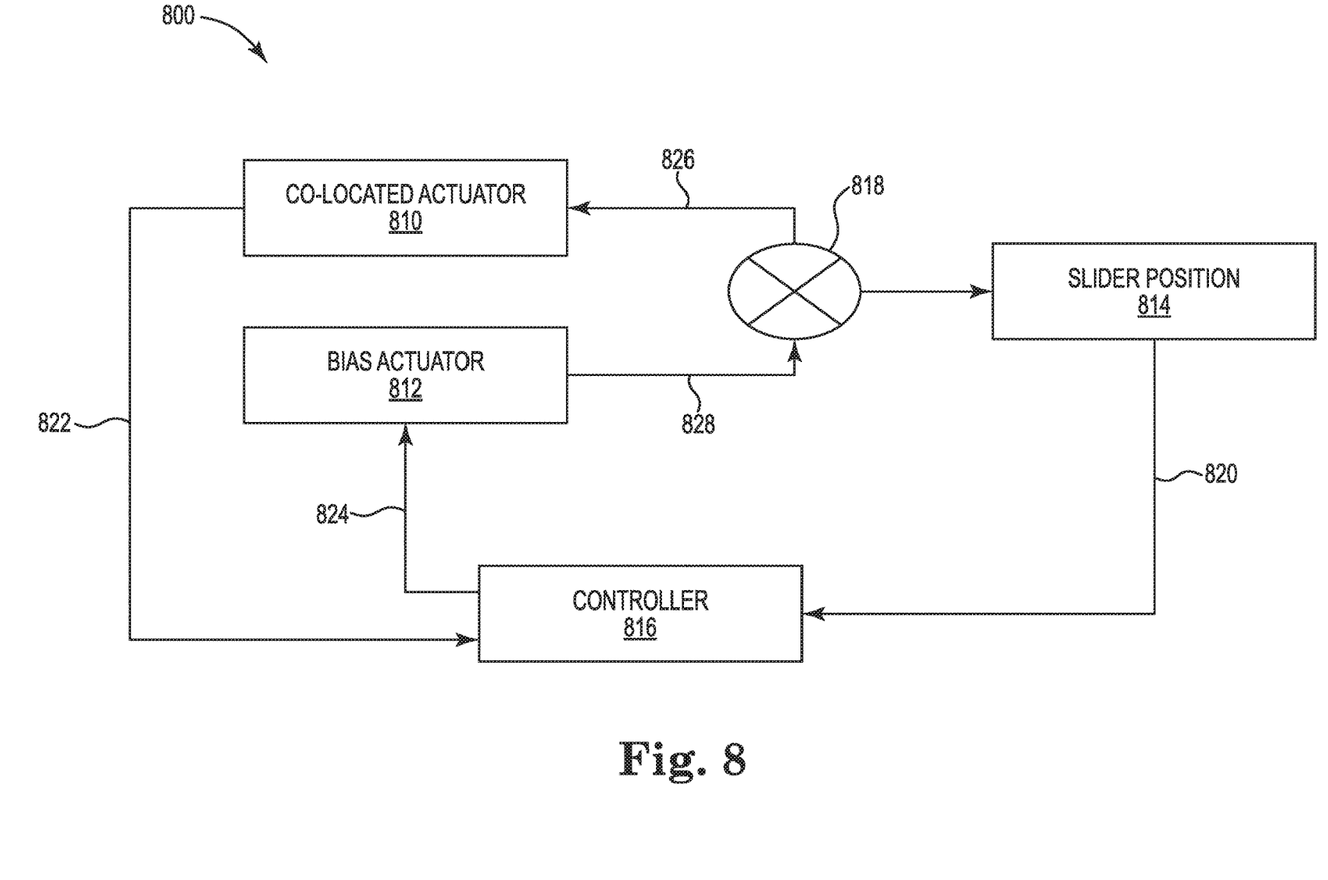
FIG. 8 is a schematic representation of a control scheme for implementing active damping and/or modulation cancellation, according to various embodiments.

As described above with respect to FIG. 4, the head transducer end 420 (and read/write head, slider, etc.) may be proximate to and operatively connected to a co-located pair of microactuators 410, which may be communicatively coupled to a controller (see controller 816 of FIG. 8 and associated description for more detail). To visualize an example of a response at a read/write head 424 or head transducer end 420 of an HGA as a function of frequency, FIG. 5 is a graph 500 showing gain (in units of dB) graphed over a frequency spectrum (in Hz) of an example range for a single microactuator pair, according to various embodiments.

To evaluate offtrack responses and general tracking performance using a single microactuator pair, a typical metric that is analyzed (e.g., by a controller) is the offtrack response of the slider at the region where the transducer elements are present, in response to the input from the single pair of microactuators. In this case, the transducer elements (e.g., head 424) are present at the head transducer end 420. This response at this location is typically modeled using finite element techniques or methods (FEM) or experimentally studied in test equipment such as a spin stand. According to various embodiments, the offtrack responses at the head transducer end 420 can be modeled using various FEMs, such as applied element method (AEM), generalized finite element method (FEM), mixed FEM, hp-FEM, hpk-FEM, XFEM, S-FEM, spectral element method, meshfree methods, discontinuous Galerkin methods, finite element limit analysis, and/or stretched grid method, among others.

A controller, as used herein, can be designed such that a convolution (i.e., a frequency domain multiplication) between the controller response and the HGA response, which can be called an open loop response, yields in the desired output to input relationship or transfer function. An ideal open loop transfer function, according to controls theory, is unity (1), for all frequencies. However, this is typically not practical because the amount of energy required to achieve unity would be nearly infinite and computational time for the controller would ideally be zero. In addition, HGA response uncertainty (due to manufacturing variances etc.) suggest that a unique controller may be needed for a specific part. Due to these limitations, it can be beneficial to include a feedback loop for control. By using a feedback loop, it can be practical to configure a single controller to account for the finite energy usage, compensate for computational delays and to provide stability margins for HGA aspect uncertainty. Feedback, according to this embodiment, can take the form of a position error signal at the slider read/write head. The controller can be designed for a particular frequency domain. Also in some embodiments, an inverse Laplace transform can be performed on a controller expression to transform a representation into a time-domain representation that can be programmed into the controller of the example HDD.

However, sensing test equipment generally represents responses of the system at a component level (e.g., only the HGA components) and may not necessarily capture responses in the example HDD, and in real time. Such responses can be less predictable and harder to model. In example drives, such responses are typically measured using position error signals (PES). While PES may offer advantageous utility in some cases, PES is typically updated only once per servo sample, meaning the PES output can be bandwidth limited. Study of offtrack responses at frequencies greater than half a servo-sampling rate may (how many times per second a secondary microactuator pair senses offtrack response) be challenging with existing setups at present, but the offtrack responses are increasingly becoming more important to performance given an increasing number of low-frequency resonance issues in example drives.

According to various embodiments, the position of the head may only be known by the controller at one of a number of servo sectors. Servo sectors can represent "landmarks servo signals" that enable the controller and servo system to read and calibrate the transducer location versus its intended location. Servo sectors can be predetermined signals written onto each disk of the HDD. It can therefore be preferable that these landmarks be kept to a minimum to maximize area for data storage in some embodiments. Therefore, the servo sectors can be spaced out evenly around the disk circumference. In some embodiments, as a result of the above, while the head of the slider is located between servo sectors, it may have no means of detecting its current position.

Figures 6A, 6B, 6C:
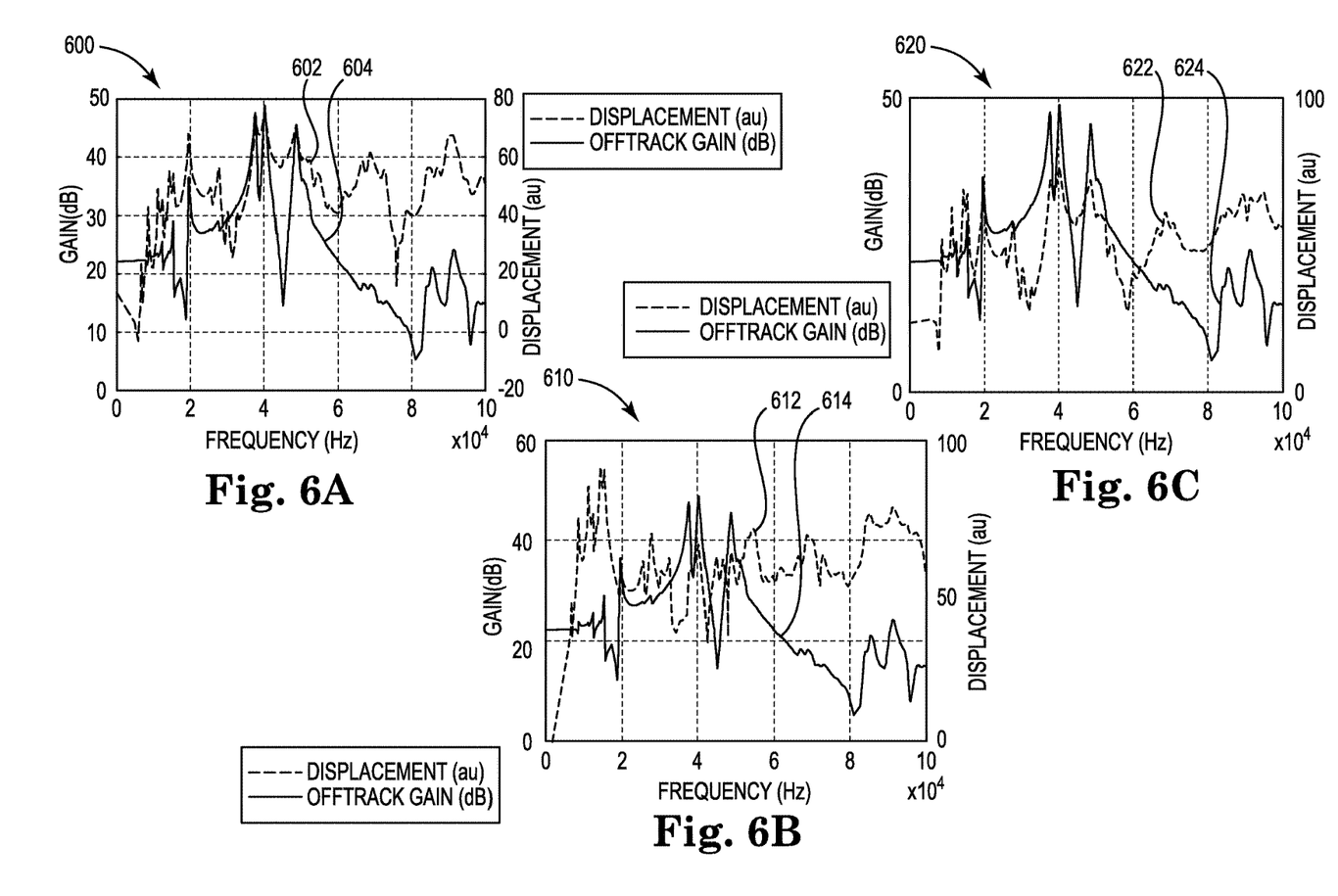
FIG. 6A shows a graph, including load beam bias microactuator pair x-direction displacement graphed with offtrack slider gain.
FIG. 6B shows a second graph, including load beam bias microactuator pair z-direction displacement graphed with offtrack slider gain.
FIG. 6C shows a third graph, including load beam bias microactuator pair y-direction displacement graphed with offtrack slider gain.

In an example procedure, in order to quantitatively evaluate the aforementioned concepts and benefits of the described dual-stage, reversible HGA, an input signal can be applied to the (primary) co-located microactuators 410 (the microactuator pair proposed for tracking control in drive) and the deformation in the x-, y- and z-directions of the pair of (secondary) load beam bias microactuators 412 can be observed and analyzed as described, as shown with respect to FIGS. 6A-6C, below. The deformation can then be input into the controller, as described herein, to improve control parameters and reduce effects of resonance within the drive.

In particular, FIGS. 6A-6C show three-dimensional deformation plots in each of the x- (6A), y- (6B) and z- (6C) directions of the secondary (sensing), load beam bias microactuator pair 412. Offtrack gain (e.g., measured in units of, voltage, dB, etc.) of a head or slider due to input to the co-located microactuator pair 410 is shown in the respective graphs, as 604, 614, and 624. Load beam bias microactuator pair 412 x-direction displacement (in atomic units [au]) is also shown in the respective graphs as 602, 612, and 622.

Generally, an offtrack response at a slider measured at the secondary, co-located microactuator pair 410 pertains and relates to a force or response that is also experienced and measured at the primary, load beam bias microactuator pair 412. See also FIG. 7 and accompanying description for more detail. Both the deformation and the corresponding offtrack response of a head or slider are plotted in the various graphs as a function of frequency, where both receive an input to the primary, co-located microactuator pair 410. The responses may be modeled using FEMs or finite element techniques, as discussed above.

As described herein, an example load beam bias microactuator pair 412 exhibits different levels of deformation in the x-, y- and z-directions as functions of frequency. The deformation plots can represent head displacement. The HGA deformations can be measured at the sensors (e.g., PZT microactuators), and are therefore expected to correlate to the deformation at the head. The head deformation measured by the microactuators can be a vector-summed response of all three direction at the head, according to various embodiments. FIG. 6A shows a graph 600, including load beam bias microactuator pair 412 x-direction displacement 602 (shown in units of au) graphed with offtrack slider gain 604 (shown in units of dB). Likewise, FIG. 6B shows a second graph 610, including load beam bias microactuator pair 412 z-direction displacement 612 (shown in units of au) graphed with offtrack slider gain 614 (shown in units of dB).

And, FIG. 6C shows a third graph 620, including load beam bias microactuator pair 412 y-direction displacement 622 (shown in units of au) graphed with offtrack slider gain 624 (shown in units of dB).

As shown and described, the various responses show that the (load beam bias 412) microactuator pair exhibits deformation at different levels in response to the (co-located 410) microactuator pair input, as a function of frequency. The net voltage generated from the load beam bias microactuator pair 412 is a function of the deformation in a poling direction, according to various embodiments. The voltage generated may be correlated to the response of the slider, in terms of various relevant frequencies (e.g., critical modes, which can be graphically visualized as peaks, troughs, etc.). Alternatively, the voltage generated may be correlated to the response of the slider, in terms of the gains of such modes.

While in use, when both the load beam bias microactuator pair 412 and the co-located microactuator pair 410 are active, it may be beneficial to separate the input signal to the load beam bias microactuator pair 412 from the output from the load beam bias microactuator pair 412 (output being in response to the input from co-located microactuator). In order to isolate the input from the output, different schemes could be employed. One of the schemes could include using the knowledge/data of the input signal to the load beam bias microactuator pair 412 a priori and designing signal filters around the frequencies of inputs or demodulation schemes to isolate the input and output. The control signal can be limited to sub 10 kHz in some embodiments. Since the microactuators by their nature are sensors and actuators simultaneously, adding a high pass filter with a bandwidth of 10 kHz in the sensor branch of the circuit can therefore remove any control signal from the output.

Alternate schemes are contemplated that utilize self-sensing, computer-controlled, techniques, which can rely on using the capacitive nature of the PZTs in the form of a Wheatstone bridge or other electric circuit structure to isolate the input and the output for measurement and/or analysis. See also FIG. 8 for more detail regarding various controllers that can be employed according to various embodiments.

Figure 7:
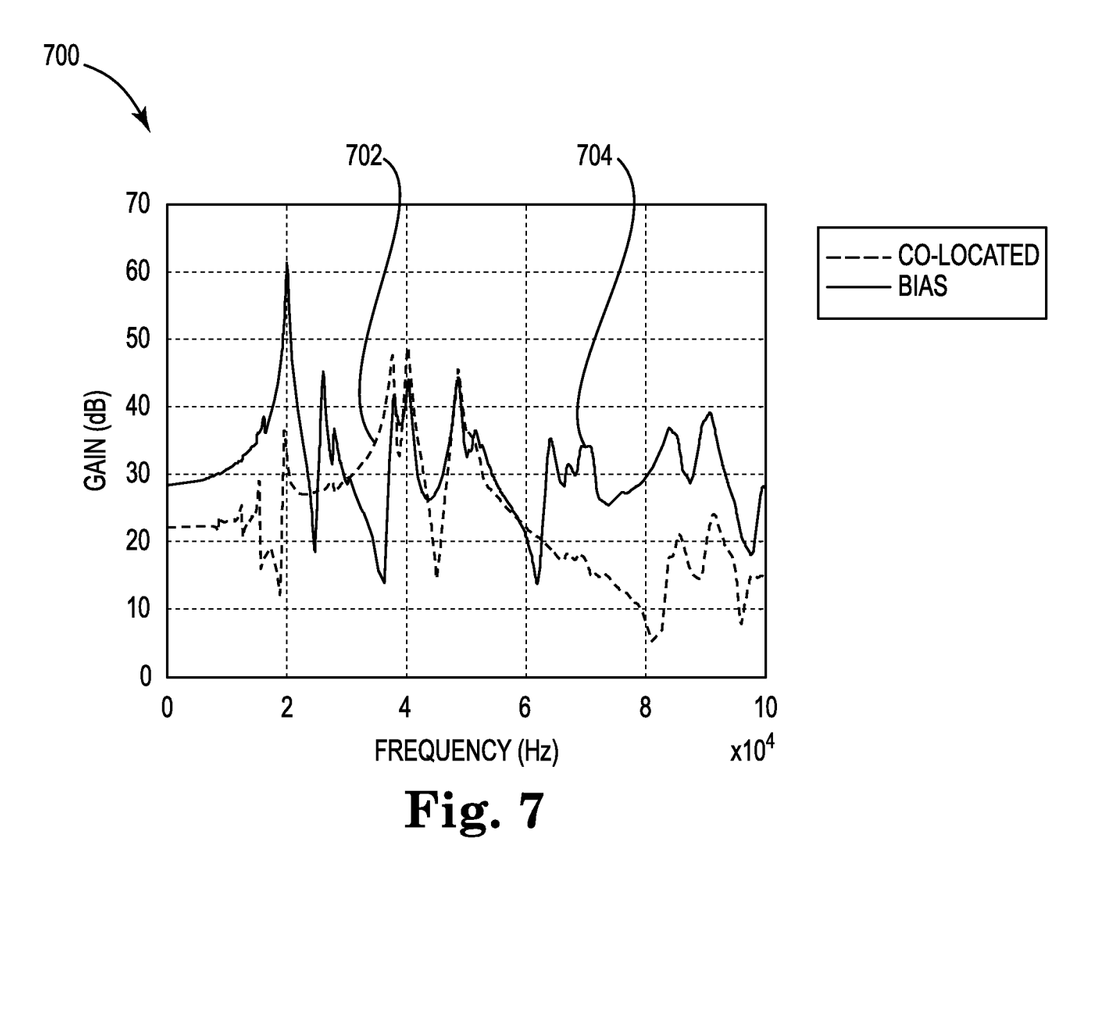
FIG. 7 shows a graph, including co-located microactuator pair excitation plotted with load beam bias microactuator pair excitation graphed in terms of frequency on the x-axis, and gain on the y-axis.

FIG. 7 shows a graph 700, including co-located microactuator pair 410 excitation 702 plotted with load beam bias microactuator pair 412 excitation 704 graphed in terms of frequency (in Hz) on the x-axis, and gain (in units of dB) on the y-axis.

An offtrack response or excitation gain (in units of dB) of a slider at a read/write head (e.g., FIG. 4, 424) in a dual-stage HGA (e.g., HGA 400) is shown by graph 700. Offtrack response can be due to inputs from both a load beam bias microactuator 704 (e.g., FIG. 4, 412) and a co-located microactuator 702 (e.g., FIG. 4, 410), and both are represented in graph 700. While the plot shows that inputs to the different microactuators pairs and modes show responses at different levels on the slider for each resonance mode, the plot also indicates that the response at each individual mode could be influenced by either the co-located microactuator pair 410 or the load beam bias microactuator pair 412 to varying degrees and/or at different levels of sensitivity.

In one scenario, the co-located microactuator pair 410 is used for sensing or tracking (i.e., constitutes a secondary pair of microactuators), but is found to excite or otherwise cause an undesirable resonance having at least one servo resonance property. In this scenario, the at least one servo resonance property may be analyzed, e.g., by a controller (e.g., controller 816 of FIG. 8), to determine whether the resonance property affects performance of the read/write head. In response, the load beam bias microactuator pair 412 input can be tuned such that response at that servo resonance property (e.g., frequencies, amplitudes, phases, etc.) could be affected and mitigated through horizontal actuation of the load beam bias microactuator pair 412. Conversely, in a reversed scenario where the load beam bias microactuator pair 412 is used for tracking but is found to excite an undesirable resonance, the co-located microactuator pair 410 input could be tuned such that response at that servo resonance frequency could be affected and/or mitigated, through the design of the servo control system.

FIG. 8 is a schematic representation of a control scheme 800 for implementing active damping and/or modulation cancellation, according to various embodiments.

Control scheme 800 can include a controller 816. The controller 816 can include various hardware and/or software components and/or modules. For example, controller 816 can include a central processing unit, a memory, and a storage component, and may have an operating system and firmware loaded thereon. The various controller 816 components may be operatively or electrically connected.

As described herein, the controller 816 can be operatively coupled to any microactuators present in various embodiments in order to improve drive performance according to various parameters and readings. In an embodiment of the control scheme 800 using controller 816, a co-located microactuator 810 may be used for track following input (secondary) and the load beam bias microactuator 812 may be used for improving a range of response (primary). The track-following response of control scheme 800 is preferably sensed at 820 using PES of the slider position 814. As described herein, position sensing may utilize both PES (e.g., track following) in addition to load beam bias/co-located microactuators (e.g., for active damping and/or modulation cancellation).

The controller 816 can be configured to selectably transmit and receive servo head resonance signals to and from the various microactuators 810 and 812 (e.g., which can correspond to 410 and 412 of FIG. 4). The controller 816 can be configured to selectably transmit any received head resonance signals from various sensors or head (e.g., 424) to itself and/or the other pair of microactuators in order to improve microactuation performance, for example by reducing undesired resonance at the head. In particular, controller 816 can transmit signals 824 to the bias actuator 812, and can receive signals 822 from the co-located actuator 810, according to various embodiments.

At junction 818, the controller 816 may receive (or provide) any control signal 822 or control input for track following input using the co-located microactuator 810. Control signal 822 can be received through co-located actuator 810 after being received from junction 818 as signal 826. An additional sensor (such as self-sensing scheme from load beam bias and/or co-located microactuators) may provide information about any higher frequency modulation and offtrack modes. Also at junction 818, the controller 816 may then transmit a control signal 824 to the load beam bias microactuator pair 812 (e.g., on top of the existing signal). Once signal 824 is received at the bias actuator 812, a signal from the bias actuator 812 can be transmitted to junction 818 to correct or actuate the slider position, thereby influencing servo resonance performance. Control signal 824 may be configured for active damping and/or modulation cancellation, among other actions.

Using the controller 816, bias input tuning may take any of multiple forms. One approach may include introducing an input at the same frequency of concern with a phase offset relative to the response. This approach might provide an opposing force on the slider compared to the one causing the undesirable excitation, thereby at least partially canceling the response. Another approach would be to introduce a multi-frequency input, (a combination of the undesirable frequency, and harmonics [sub- and super-] thereof) to produce a similar or same effect as before. However, this approach may involve tuning an algorithm to get the desired input signal. A number of heuristic approaches exist for the same, as are well known, which may be beneficially employed.

Figure 9:
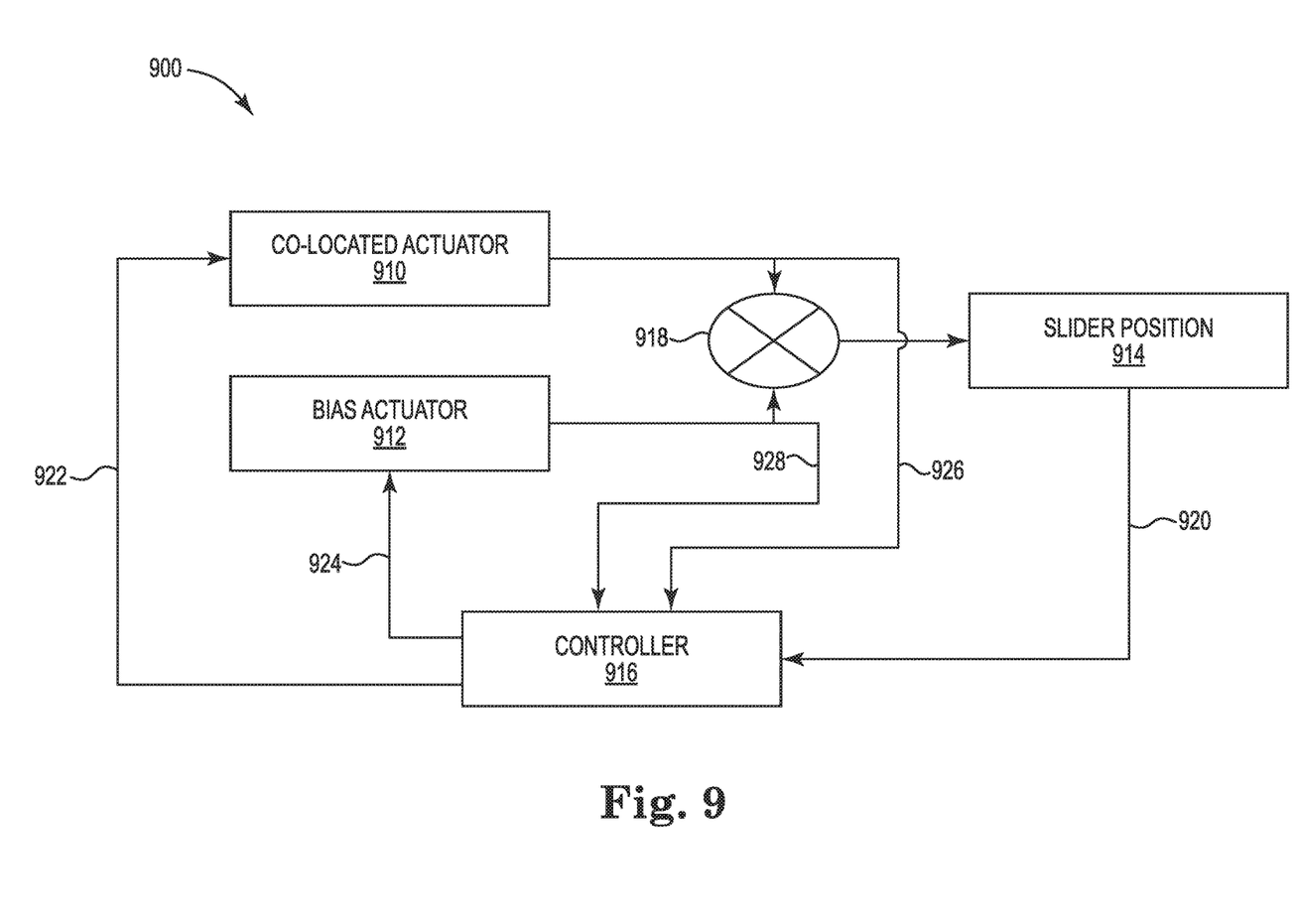
FIG. 9 is a schematic representation of a control scheme for implementing actuation at both co-located actuators and bias actuators in tandem to improve actuation stroke, resonance properties, and controllability of a head, according to various embodiments.

FIG. 9 is a schematic representation of a control scheme 900 for implementing actuation at both co-located actuators 910 and bias actuators 912 in tandem to improve actuation stroke, resonance properties, and controllability of a head, according to various embodiments.

Control scheme 900 can include a controller 916. The controller 916 can include various hardware and/or software components and/or modules. For example, controller 916 can include a central processing unit, a memory, and a storage component, and may have an operating system and firmware loaded thereon. The various controller 916 components may be operatively or electrically connected.

As described herein, the controller 916 can be operatively coupled to any microactuators present in various embodiments in order to improve drive performance according to various parameters and readings. In an embodiment of the control scheme 900 using controller 916, a co-located microactuator 910 may be used for fine-tuning of head position at a precise level (secondary), and the load beam bias microactuator 912 may be used for improving a range of response of the head at a coarser level (primary).

The controller 916 can be configured to selectably transmit and receive servo head resonance signals to and from the various microactuators 910 and 912 (e.g., which can correspond to 410 and 412 of FIG. 4). The controller 916 can be configured to selectably transmit finer actuation commands to co-located actuator 910 through signal 922, and/or coarser actuation commands to bias actuator 912. The controller 916 can also receive actuation signals 926 and 928 from the co-located actuator 910 and the bias actuator 912, respectively, as output signals from the actuators connect to junction 918.

Once signals 922 and 924 are received at the co-located actuator 910 and bias actuator 912, respectively, a signal 928 from the bias actuator 912 can be transmitted to junction 918 to correct or actuate the slider position, and a signal 926 can be transmitted to junction 918 to also correct or actuate the slider position, thereby influencing servo position and/or resonance performance. Signals 926 and 928 can each branch off, and can each connect both to the junction 918 for slider control, and back to controller 916 for closed-loop control, e.g., of future head actuations at 914.

Using the controller 916, various signals 922 and 924 can be transmitted to actuators 910 and 912, respectively, and closed-loop control can be implemented as described to make adjustments to control during use, and according to various imperfections or inconsistencies in hardware to be controlled by controller 916. By employing both co-located actuator 910 and bias actuator 912 in tandem, a head of a slider can be controlled with improved stroke/range, improve resonance properties, and improved precision for positioning slider (and head) at 914.

Various servo control circuits and schemes for active damping and modulation cancellation may vary from a simple passive control using a microactuator pair for damping across the entire spectrum (may require energy dissipation from the microactuator pair) to any and all control algorithms that would implement modal damping and cancellation.

Reference is made herein to the accompanying drawings, which form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the disclosure will be gained through a discussion of the examples provided.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

What is claimed is:

1. A head suspension assembly for supporting a read/write head of a disk drive located on a rotatable drive actuator arm, the head suspension assembly comprising:
    a load beam including a base portion for connection to the drive actuator arm for moving the load beam relative to a disk and a flexure for connection with a head and to permit movement of the head for orientation thereof relative to a surface of the disk;
    a first microactuator pair operatively provided and coupled to the load beam for controlled deflections of a first load beam portion and providing fine movements to a head transducer end of the load beam relative to the disk;
    a second microactuator pair operatively positioned along the head suspension distal to the first microactuator pair for allowing deflection of at least one of another portion of the head suspension including at least one of a second portion of the load beam or a portion of the flexure; and
    a controller electrically connected with the first and second microactuator pair for selectively transmitting and receiving electrical signals to or from the first and second microactuator pairs as the first and second microactuator pairs can be selectively signaled to move the head transducer end of the head suspension by the controller or the controller can received a signal from at least one pair of the first and second microactuator pairs based upon a sensing of deformation within the head suspension assembly.

2. The head suspension assembly of claim 1, wherein the first microactuator pair are bias microactuators that are controlled to cause deflection of the first load beam portion and move the head transducer end of the head suspension assembly.

3. The head suspension assembly of claim 1, wherein the second microactuator pair are co-located microactuators that are also controlled to cause deflection of the another portion of the head suspension assembly independently of the first microactuator pair.

4. The head suspension assembly of claim 3, wherein the controller is configured to receive sensed deformation data from the second microactuator pair in order to selectively transmit control signals to the first microactuator pair.

5. The head suspension assembly of claim 1, wherein the first microactuator pair is further configured for servo sensing.

6. The head suspension assembly of claim 4, wherein the controller is further configured to selectively transmit and receive sensed deformation data and controlled deformation signals to and from the first and second microactuator pairs in order to reduce an undesired resonance.

7. A head suspension assembly for supporting a read/write head of a disk drive located on a rotatable drive actuator arm, the head suspension assembly comprising:
    a load beam including a base portion for connection to the drive actuator arm for moving the load beam relative to a disk and a flexure for connection with a head and to permit movement of the head for orientation thereof relative to a surface of the disk;
    a first microactuator pair operatively provided and coupled to the load beam for controlled deflections of a first load beam portion and providing fine movements to a head transducer end of the load beam relative to the disk;
    a second microactuator pair operatively positioned along the head suspension distal to the first microactuator pair for allowing deflection of at least one of another portion of the head suspension including at least one of a second portion of the load beam or a portion of the flexure; and
    a controller electrically connected with the first and second microactuator pair for selectively transmitting and receiving electrical signals to or from the first and second microactuator pairs as the first and second microactuator pairs can be selectively signaled to move the head transducer end of the head suspension by the controller or the controller can received a signal from at least one pair of the first and second microactuator pairs based upon a sensing of deformation within the head suspension assembly,
    wherein the controller is further configured to selectively transmit and receive sensed deformation data and controlled deformation signals to and from the first and second microactuator pairs in order to reduce an undesired resonance by providing an active damping to the head suspension assembly.

8. The head suspension assembly of claim 7, wherein the first microactuator pair is configured for servo tracking control.

9. The head suspension assembly of claim 7, wherein the first microactuator pair is configured for servo sensing.

10. The head suspension assembly of claim 7, wherein the first microactuator pair is configured for servo actuation.

11. The head suspension assembly of claim 7, wherein the first and second microactuator pairs form a sensor-actuator pair.

12. The head suspension assembly of claim 11, wherein the first microactuator pair is configured for sensing and the second microactuator pair is configured for actuation based on the sensing at the first microactuator pair.

13. The head suspension assembly of claim 7, wherein the second microactuator pair enables an increased range of read/write head motion as compared to the first microactuator pair.

14. The head suspension assembly of claim 7, wherein the controller is a servo control circuit.

15. A storage device, comprising:

a rotatable storage disk;

a rotatable drive actuator arm;

a head suspension assembly comprising a load beam including a base portion in connection with the drive actuator arm for moving the load beam relative to the disk and a flexure movably supporting with a head to permit movement of the head for orientation thereof relative to a surface of the disk;

a first microactuator pair operatively provided and coupled to the load beam for controlled deflections of a first load beam portion and providing fine movements to a head transducer end of the load beam relative to the disk;

a second microactuator pair operatively positioned along the head suspension distal to the first microactuator pair for allowing deflection of at least one of another portion of the head suspension including at least one of a second portion of the load beam or a portion of the flexure; and a controller electrically connected with the first and second microactuator pair for selectively transmitting and receiving electrical signals to or from the first and second microactuator pairs as the first and second microactuator pairs can be selectively signaled to move the head transducer end of the head suspension by the controller or the controller can received a signal from at least one pair of the first and second microactuator pairs based upon a sensing of deformation within the head suspension assembly, wherein the controller is configured to selectively transmit control signals to the first and second microactuator pairs in order to improve tracking control of the read/write head.

16. The storage device of claim 15, wherein the first microactuator pair are bias microactuators that are controlled to cause deflection of the first load beam portion and move the head transducer end of the head suspension assembly.

17. The storage device of claim 16, wherein the second microactuator pair are co-located microactuators that are also controlled to cause deflection of the another portion of the head suspension assembly independently of the first microactuator pair.

18. The storage device of claim 15, wherein the controller is configured to receive sensed deformation data from the second microactuator pair in order to selectively transmit control signals to the first microactuator pair.

19. The storage device of claim 15, wherein the first microactuator pair is further configured for servo sensing.

20. The storage device of claim 19, wherein the controller is further configured to selectively transmit and receive sensed deformation data and controlled deformation signals to and from the first and second microactuator pairs in order to reduce an undesired resonance.

* * * * *